US010056741B2

(12) United States Patent
Herreros et al.

(10) Patent No.: US 10,056,741 B2
(45) Date of Patent: Aug. 21, 2018

(54) MOBILE POLE AND CUTTING DEVICE

(71) Applicant: Schneider Electric Industries SAS, Rueil-Malmaison (FR)

(72) Inventors: Javier Herreros, Grenoble (FR); Hubert Roelandt, Vif (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/145,272

(22) Filed: May 3, 2016

(65) Prior Publication Data
US 2016/0352084 A1 Dec. 1, 2016

(30) Foreign Application Priority Data

May 28, 2015 (FR) ...................................... 15 54812

(51) Int. Cl.
*H01H 73/04* (2006.01)
*H02B 1/00* (2006.01)
(Continued)

(52) U.S. Cl.
CPC .............. *H02B 13/00* (2013.01); *H01H 73/04* (2013.01); *H02B 1/00* (2013.01); *H01H 1/226* (2013.01)

(58) Field of Classification Search
CPC ........ H01H 73/04; H01H 1/226; H01H 71/43; H01H 71/505; H01H 2001/001;
(Continued)

(56) References Cited

U.S. PATENT DOCUMENTS 3,021,400 A * 2/1962 Goodwin, Jr. ............ H01H 3/30
200/50.26
3,600,538 A * 8/1971 Puzas ..................... H01H 71/70
200/400
(Continued)

FOREIGN PATENT DOCUMENTS

EP  0 222 645 A1   5/1987
EP  1 914 767 A1   4/2008
(Continued)

OTHER PUBLICATIONS

Captive Fastener CFS2 Srews , Captive Fastener Corp, Flush-Mounted Panel Screw Components, 2011.*
(Continued)

*Primary Examiner* — Dion R Ferguson
*Assistant Examiner* — Amir Jalali
(74) *Attorney, Agent, or Firm* — Oblon, McClelland, Maier & Neustadt, L.L.P.

(57) ABSTRACT

A mobile pole of a switchgear that includes a pole cage comprising two parallel lateral walls, at least one of which delimits at least one centering hole defining a centering axis and an interior volume; a support leg, the pole cage being constrained to rotate with the support leg; and two flanges, each being configured to be connected to a respective lateral wall of the pole cage and including fixing members being configured to cooperate with the at least one centering hole, at least one of the fixing members being a load take-up device including a fixing part defining an insertion axis and a centering part adapted to cooperate with the fixing part and being configured to be inserted at least partly into the interior volume of the at least one centering hole with which said at least one of the fixing members is configured to cooperate so that the insertion axis of the centering part is aligned with the
(Continued)

centering axis of the centering hole with which said at least one of the fixing members is configured to cooperate.

10 Claims, 5 Drawing Sheets

(51) Int. Cl.
  *H02B 13/00* (2006.01)
  *H01H 1/22* (2006.01)
(58) Field of Classification Search
  CPC ... H01H 2001/5838; H01H 2071/2427; H01H 77/101; H01H 3/30; H01H 51/06; H01H 3/32; H01H 3/46; H01H 51/10; H01H 1/2008; H01H 71/56; H02B 3/00; H02B 13/00; H02B 1/00
  USPC ....... 361/605–621; 335/9, 76, 147, 165–167, 335/171; 200/281, 323–326
  See application file for complete search history.

(56) References Cited

U.S. PATENT DOCUMENTS

| | | | | |
|---|---|---|---|---|
| 3,873,950 | A * | 3/1975 | Guschin | H01H 77/10 335/176 |
| 4,672,157 | A * | 6/1987 | Neel | H01H 9/34 200/305 |
| 4,713,508 | A | 12/1987 | Baginski et al. | |
| 5,196,815 | A * | 3/1993 | Chien | H01H 1/54 335/147 |
| 5,224,590 | A * | 7/1993 | Milianowicz | H01H 3/30 200/400 |
| 6,479,770 | B2 * | 11/2002 | Dahl | H01H 71/04 200/318 |
| 6,977,568 | B1 | 12/2005 | Rakus et al. | |
| 9,318,292 | B2 * | 4/2016 | Cazals | H01H 71/04 |
| 2004/0069604 | A1 * | 4/2004 | Carrara | H01H 1/2066 200/50.01 |
| 2006/0096846 | A1 * | 5/2006 | Rival | H01H 1/027 200/400 |
| 2006/0133043 | A1 * | 6/2006 | Boudreaux | H05K 1/144 361/704 |
| 2006/0254896 | A1 * | 11/2006 | Turner | G05G 1/04 200/401 |
| 2010/0014218 | A1 * | 1/2010 | Mori | H01H 33/42 361/619 |
| 2012/0206312 | A1 * | 8/2012 | Coupland | H01Q 1/225 343/786 |
| 2015/0219134 | A1 * | 8/2015 | Yamaguchi | F16B 5/02 403/11 |

FOREIGN PATENT DOCUMENTS

| | | | | |
|---|---|---|---|---|
| EP | 1914767 | A1 * | 4/2008 | ............ H01H 1/226 |
| EP | 2 187 421 | A1 | 5/2010 | |
| EP | 2187421 | A1 * | 5/2010 | ............ H01H 1/226 |
| FR | 2 589 625 | A1 | 5/1987 | |

OTHER PUBLICATIONS

Captive Fastener CFS2 Screws, Captive Fastener Corp, Flush-Mounted Panel Screw Components, 2011 http://www.captive-fastener.com/Catalog/CFS2_CFR2_CFN2.pdf.*
Preliminary Search Report dated Apr. 5, 2016 in French Patent Application No. FR1554812 (with English language translation of categories of cited documents).

* cited by examiner

MOBILE POLE AND CUTTING DEVICE

The present invention concerns a switchgear mobile pole. The invention also relates to switchgear including at least one such mobile pole.

There is known from the document EP 0 222 645 A1 switchgear offering high electrodynamic performance and including an input, an output, mobile poles and fixed poles.

Each mobile pole includes a set of mobile contacts.

Each fixed pole includes at least one fixed contact.

The switchgear allows current to pass between its input and its output when the mobile contacts are in contact with the fixed contacts. The switchgear is in a closed position.

The switchgear does not allow current to pass between its input and its output when the mobile contacts are far away from the fixed contacts. The switchgear is in an open position.

Existing switchgear mechanical structures have a short service life, that is to say a limited number of switchgear opening and closing cycles.

On the other hand, from a higher mechanical endurance level, the round trip dynamic effect causes the switchgear to break.

Now, some industries require a switchgear structure able to withstand an increasing number of cycles. This is the case of the wind turbine sector, for example.

There is therefore a requirement for a switchgear structure adapted to a higher mechanical endurance level.

To this end there is proposed a switchgear mobile pole including a pole cage, the pole cage including two parallel lateral walls, at least one of the two parallel lateral walls delimiting at least one centering hole defining a centering axis and an interior volume. The mobile pole also includes a support leg and two flanges. The pole cage is constrained to rotate with the support leg. Each flange is adapted to be connected to a respective lateral wall of the pole cage, each flange including fixing members, each fixing member being intended to cooperate with a respective one of the centering holes, at least one of the fixing members being a load take-up device including a fixing part defining an insertion axis and a centering part adapted to cooperate with the fixing part, the centering part being adapted to be inserted at least partly into the interior volume of the centering hole with which said at least one of the fixing members is adapted to cooperate so that the insertion axis of the centering part is aligned with the centering axis of the centering hole with which said at least one of the fixing members is adapted to cooperate.

In accordance with particular embodiments, the mobile pole has one or more of the following features, separately or in any technically possible combination:

at least one of the lateral walls delimits two centering holes each defining a centering axis and an interior volume, the flange, which is adapted to be connected to the lateral wall in question including two load take-up devices;

the lateral wall has an elongate shape in a first direction, the two load take-up devices being arranged along a line parallel to the first direction;

the lateral wall includes an upper extremity, a lower extremity and a median part connecting the two extremities, the support leg being connected to the lower extremity of the lateral wall of the pole cage, the first centering hole being delimited by the upper extremity of the lateral wall, the second centering hole being delimited by the median part of the lateral wall;

the lateral wall has no centering stud;

the fixing part and the centering part of each load take-up device are in one piece;

at least one of the load take-up devices is a shouldered screw;

the fixing part and the centering part of each load take-up device are two separate parts;

the centering part of each load take-up device is part of the flange.

There is also proposed switchgear including at least one mobile pole as defined above and a fixed pole for each mobile pole. Each mobile pole is adapted to cooperate with a respective fixed pole. The switchgear also includes a mechanism adapted to manoeuvre the position of each mobile pole relative to the fixed pole with which the mobile pole is adapted to cooperate.

Other features and advantages of the invention will become apparent on reading the following description of embodiments of the invention given by way of example only and with reference to the drawings, in which.

Figure 1:
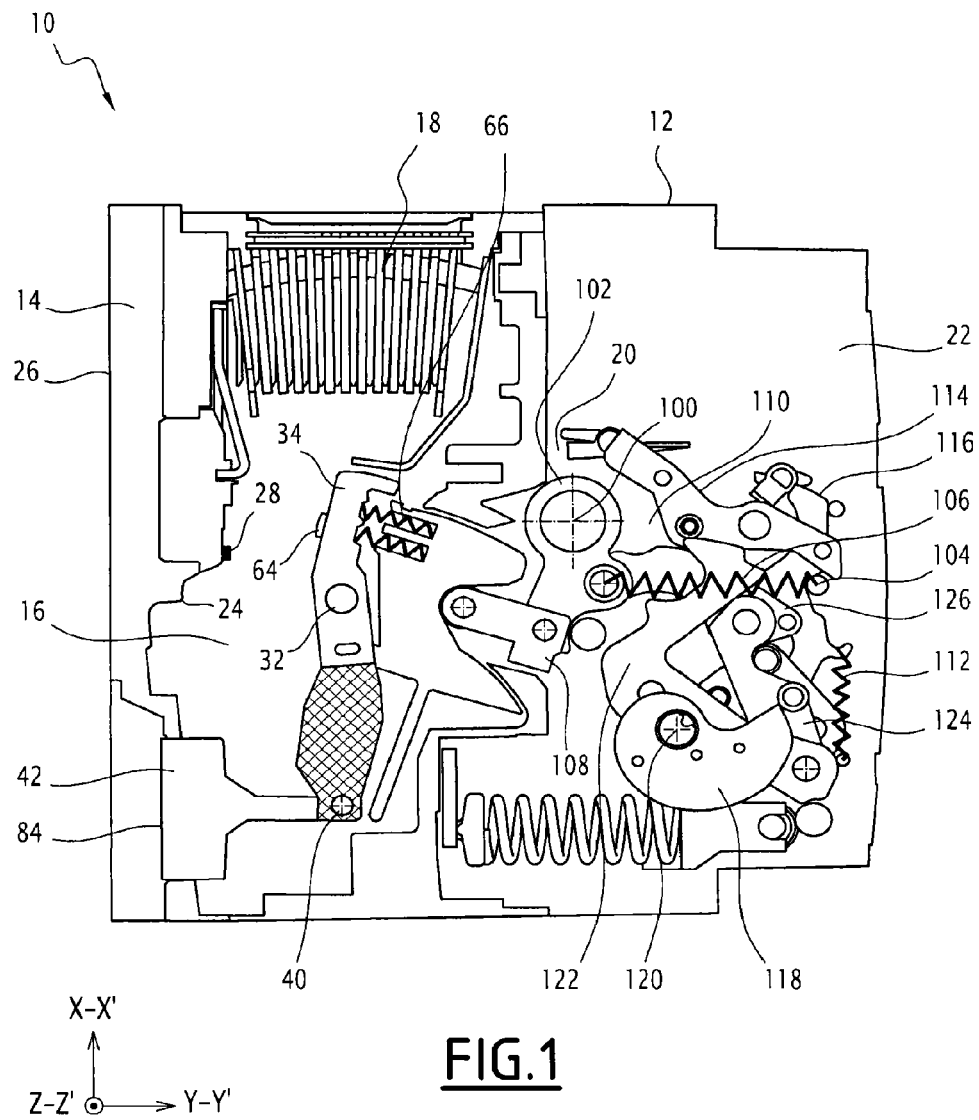
FIG. 1 is a sectional view of one example of switchgear.

Switchgear 10 is represented in FIG. 1.

The switchgear 10 is adapted to interrupt the passage of electrical current or to allow the passage of electrical current between an input of the switchgear 10 and an output of the switchgear 10.

The switchgear 10 is in an open position when the passage of current between the input and the output is interrupted. The switchgear 10 is in a closed position when the passage of current between the input and the output is not interrupted.

The switchgear 10 is a circuit-breaker, for example.

In particular, the circuit-breaker is for example a circuit-breaker offering high electrodynamic performance, that is to say a circuit-breaker rated at 800 A or more. The circuit-breaker is preferably rated 3200 A or more.

In accordance with another example, the switchgear 10 is an interruptor.

The switchgear 10 includes a casing 12, also known as a cover or shield, a wall 14, a set of mobile poles 16, arc extinction chambers 18, a pole shaft 20 and a drive mechanism 22.

The casing 12 defines a first, interior space of the switchgear 10 and a second, exterior space of the switchgear 10.

The wall 14 lies primarily in a plane.

The plane is defined by a first axial direction designated X-X' and a second axial direction designated Z-Z' in FIG. 1.

The first axial direction X-X' is in the plane of the drawing sheet.

The second axial direction Z-Z' is perpendicular to the plane of the drawing sheet.

The wall 14 includes a first face 24, a second face 26 and a set of fixed electrical contacts 28.

The first face 24 is situated in the first, interior space of the switchgear 10.

The second face 26 is situated in the second, exterior space of the switchgear 10.

The fixed electrical contacts 28 are arranged along the second axial direction Z-Z'.

In FIG. 1, only one fixed electrical contact 28 is represented.

Generally speaking, when elements are arranged along the second axial direction Z-Z', only one of those elements is represented in FIG. 1.

The fixed electrical contacts 28 are fixed to the first face 24.

Each fixed electrical contact 28 has the shape of a pad.

Each pad is made of a conductive material.

The conductive material is a silver-plated alloy, for example.

The mobile poles 16 are arranged along the second axial direction Z-Z'.

Figure 2:
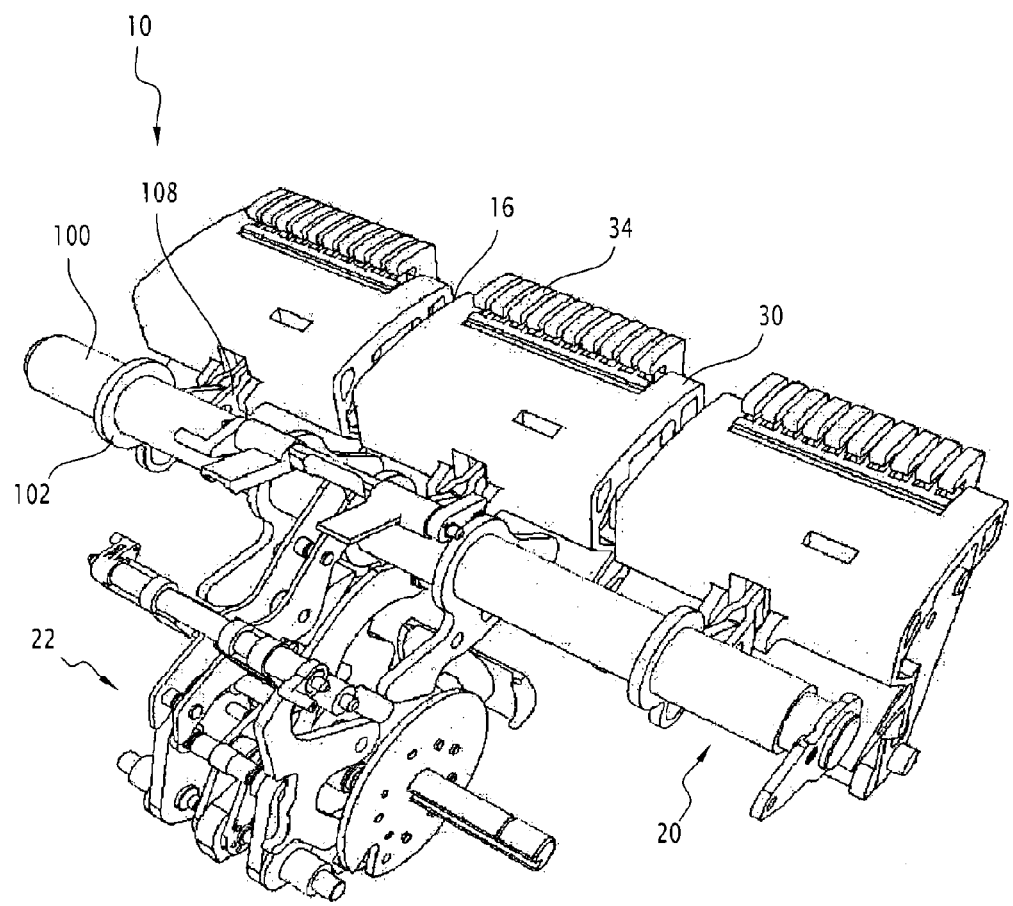
FIG. 2 is a perspective view of a drive mechanism of the switchgear from FIG. 1.
Figure 4:
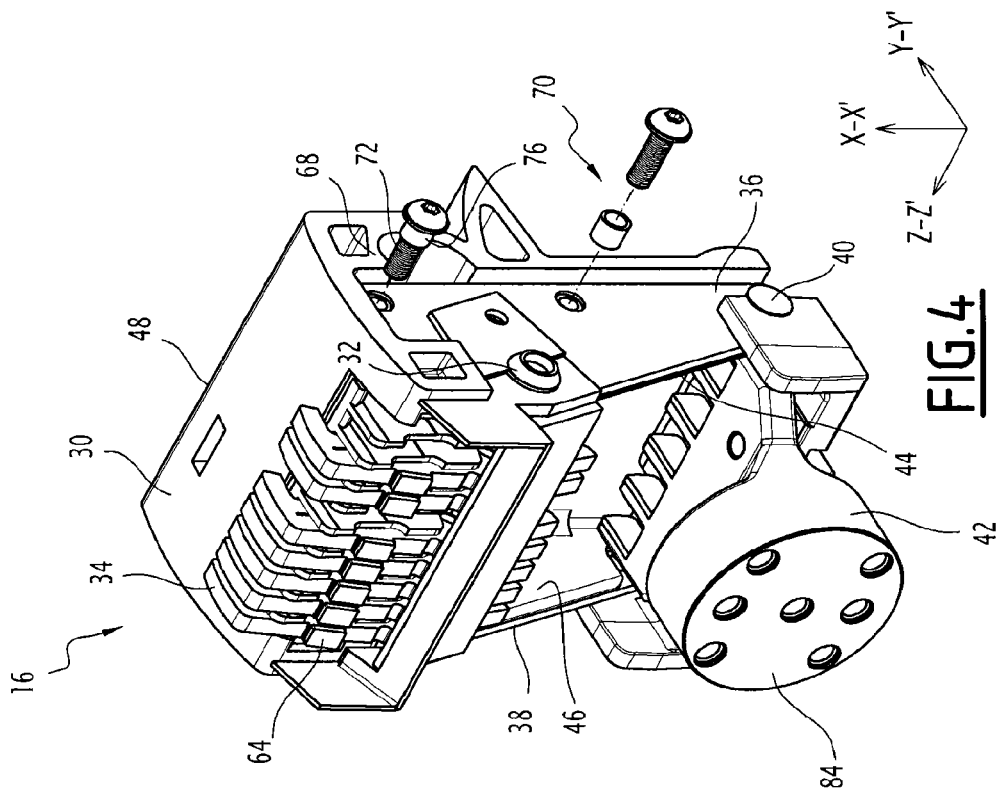
FIGS. 3 and 4 are perspective views of one example of a mobile pole.
Figure 3:
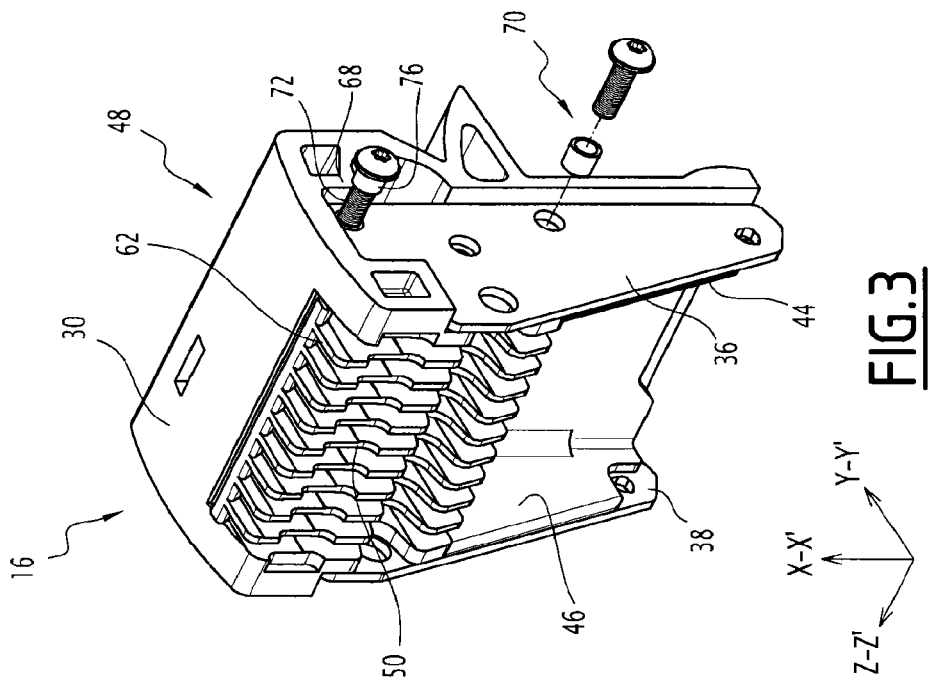
Figure 5:
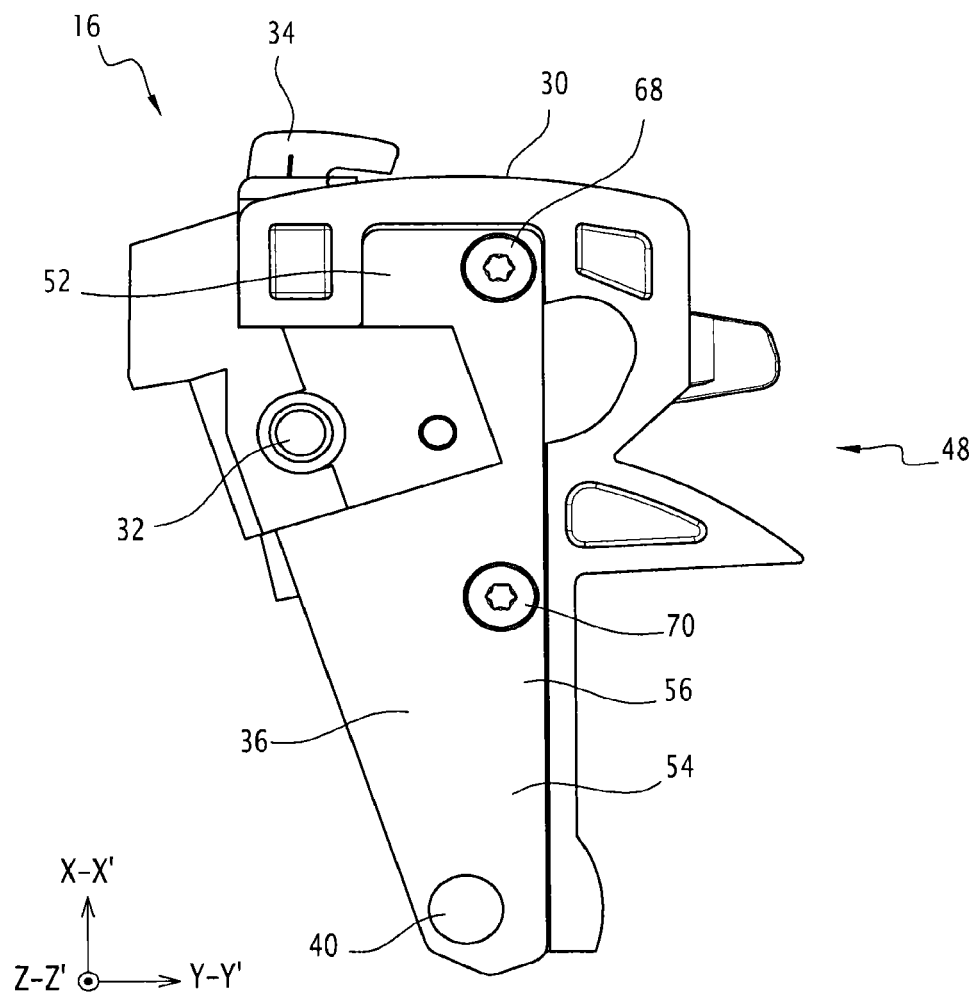
FIG. 5 is a side view of the mobile pole from FIG. 3.
Figure 6:
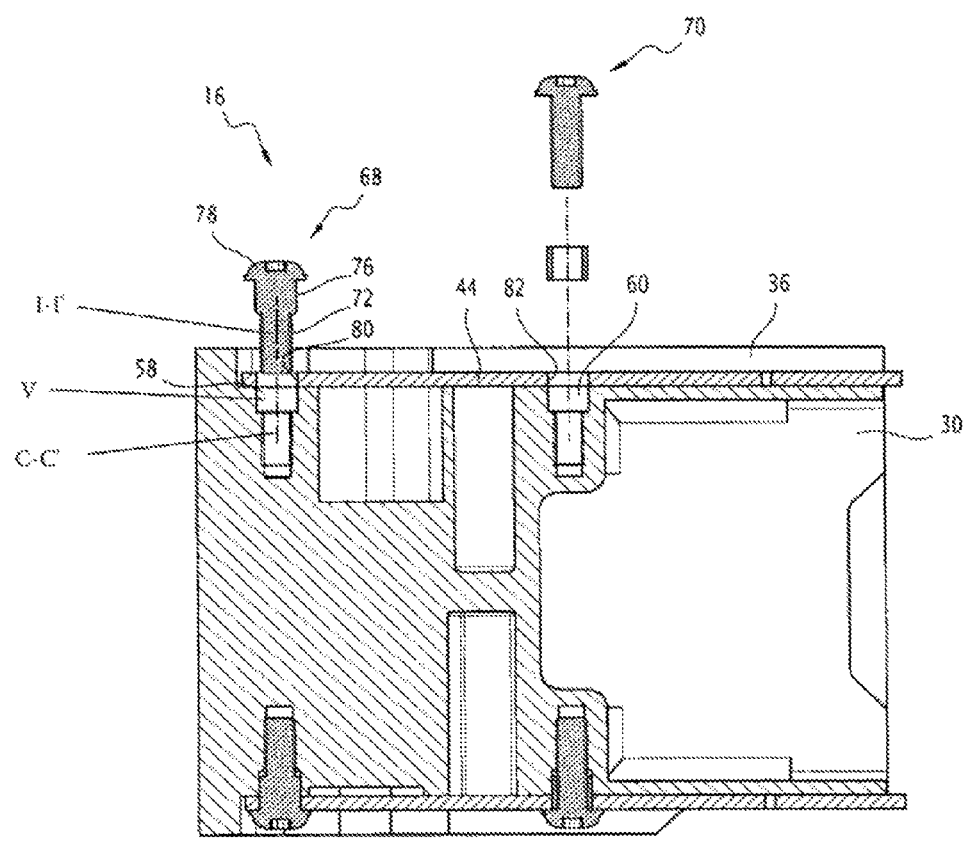
FIG. 6 is a view of the mobile pole from FIG. 3 in section on a first section plane.

As can be seen in FIG. 2, the switchgear 10 includes three mobile poles 16: a central mobile pole and two lateral mobile poles.

One example of a mobile pole 16 is represented in FIGS. 3 to 6.

As can be seen in FIGS. 3 to 6, the mobile pole 16 includes a pole cage 30, a shaft 32, a set of supports 34 (not shown in FIGS. 3 and 6), a first flange 36, a second flange 38, a pivot 40 and a support leg 42.

The pole cage 30 is substantially elongate along a first axial direction X-X'.

The pole cage 30 is made of thermodur material.

The pole cage 30 includes a first lateral wall 44, a second lateral wall 46, a rear face 48 and a support receiving structure 50.

The first lateral wall 44 lies substantially in a plane.

That plane is defined by the first axial direction X-X' and a third axial direction Y-Y'.

The third axial direction Y-Y' is perpendicular to the first axial direction X-X' and the second axial direction Z-Z'.

The first lateral wall 44 has a first extremity 52 called the upper extremity, a second extremity 54 called the lower extremity, and a median part 56.

In accordance with the example from FIGS. 3 to 6, the lower end 54 has a flared shape.

The median part 56 connects the extremities 52 and 54 of the first lateral wall 44.

The first lateral wall 44 moreover delimits a first centering hole 58 and a second centering hole 60.

The first centering hole is situated in the upper extremity 52 of the pole cage 30.

The first centering hole 58 defines a first centering axis C-C' and a first interior volume V.

The first centering axis C-C' is parallel to the second axial direction Z-Z'.

The second centering hole 60 is situated in the median part 56.

The second centering hole has the same characteristics as the first centering hole 58.

In accordance with the particular example from FIGS. 3 to 6, the second centering hole 60 is situated substantially equidistantly from the upper extremity 52 and the lower extremity 54. By substantially is meant that the distance between the second centering hole 60 and the upper end 52 is equal to the distance between the second centering hole 60 and the lower extremity 54 plus or minus 5%.

Moreover, as is the case for FIGS. 3 to 6, the first lateral wall 44 preferably has no studs that could project from the pole cage 30.

The first lateral wall 44 and the second lateral wall 46 are symmetrical with respect to a plane of symmetry.

The plane of symmetry is defined by the first axial direction X-X' and the third axial direction Y-Y'.

The same remarks relating to the first lateral wall 44 therefore apply equally to the second lateral wall 46. Those remarks are not repeated.

The rear face 48 lies substantially in a plane.

The plane is defined by the first axial direction X-X' and the second axial direction Z-Z'.

The first lateral wall 44, the second lateral wall 46 and the rear face 48 define the interior space of the pole cage 30.

Hereinafter, the term "front of the pole cage 30" designates the area situated opposite the rear face 48.

The straight line segment defined by the first centering hole 58 and the second centering hole 60 is substantially parallel to the first axial direction X-X' and situated in the vicinity of the rear face 48 of the pole cage 30.

The support-receiving structure 50 is adapted to accommodate the supports 34.

The support-receiving structure 50 includes a set of plates 62.

The plates 62 are regularly arranged along the second axial direction Z-Z'.

The plates 62 lie in parallel and regularly spaced planes.

The planes in which the plates 62 lie are defined by the first axial direction X-X' and the third axial direction Y-Y'.

The shaft 32 extends in the second axial direction Z-Z'.

The shaft 32 passes through the first lateral wall 44 and the second lateral wall 46.

The shaft 32 is connected to the mobile pole 16.

The supports 34 are arranged along the second axial direction Z-Z'.

The supports 34 are articulated to rotate about the shaft 32 inside the pole cage 30.

Each support 34 has an elongate shape substantially oriented in the first axial direction X-X'.

Each support 34 includes a mobile electrical contact 64 and spring members 66.

The mobile electrical contact 64 of a support 34 is situated toward the front of the pole cage 30.

To each fixed electrical contact 28 there corresponds a mobile electrical contact 64.

The fixed electrical contact 28 and the corresponding mobile electrical contact 64 are adapted to be in contact when the switchgear 10 is closed.

Each mobile electrical contact 64 has the shape of a pad.

Each pad is made of a conductive material. The conductive material is a silver-plated alloy, for example.

The spring members 66 are arranged along the second axial direction Z-Z'.

The spring members 66 are adapted to spring-load the mobile electrical contacts 64 so that the mobile electrical contacts 64 project from the pole cage 30.

The spring members 66 are one or more contact pressure springs, for example.

Each spring member 66 has a first end and a second end.

The first end is fixed to a support 34.

The second end is fixed to the pole cage 30.

The first flange 36 is adapted to be connected to the first lateral wall 44.

The first flange 36 has a substantially flat structure the shape of which is similar to the shape of the first lateral wall 44.

The term lower extremity 54 of the first flange 36 is therefore used in the remainder of the description.

The first flange 36 includes a first fixing member 68 and a second fixing member 70.

Each fixing member 68, 70 is intended to cooperate with a respective centering hole 58, 60.

In the particular example from FIGS. 3 to 6, the first fixing member 68 and the second fixing member 70 are identical.

The same remarks relating to the first fixing member 68 therefore apply equally to the second fixing member 70. Only the first fixing member 68 is described hereinafter.

The first fixing member 68 is a load take-up device.

The first fixing member 68 includes a fixing part 72 defining a first insertion axis I-I' and a centering part 76 adapted to co-operate with the fixing part 72.

By centering the first flange 36 on the first lateral wall 44 is meant maintaining the alignment of the first insertion axis I-I' and the first centering axis C-C'. Centering the second flange 38 on the second lateral 46 is defined in a similar way.

The expression centering the flanges 36, 38 on the pole cage 30 is generally used hereinafter.

The centering part 76 is adapted to be inserted at least partly into the first interior volume V so that the first insertion axis I-I' of the centering part is aligned with the first centering axis C-C'.

In accordance with the particular example from FIGS. 3 to 6, the fixing part 72 of the first fixing member 68 is a screw and the centering part 76 of the first fixing member 68 is a centering ring.

The screw is made of metal and includes a screw body.

The screw body is a threaded rod.

The screw body has a length between 19 millimeters and 21 millimeters and a diameter between 5.5 millimeters and 6.5 millimeters.

The screw includes a screwhead 78.

The screwhead 78 has a diameter greater than the diameter of the screw body.

The centering ring has a circular cylindrical shape, the screw being inserted in the centering ring.

The centering ring has an inside diameter greater than the diameter of the screw body and less than the diameter of the screw head 78.

The centering ring has a length between 7.5 millimeters and 8.5 millimeters.

The first flange 36 moreover delimits a first insertion hole 80 and a second insertion hole 82.

The first insertion hole 80 is adapted to receive the first fixing member 68.

The first insertion hole 80 coincides with the first centering hole 58.

The second insertion hole 82 is adapted to receive the second fixing member 70.

The second insertion hole 82 coincides with the second centring hole 60.

The first flange 36 and the second flange 38 are symmetrical with respect to a plane of symmetry.

The plane of symmetry is defined by the first axial direction X-X' and the third axial direction Y-Y'.

The same remarks relating to the first flange 36 therefore apply equally to the second flange 38. Those remarks are not repeated.

The pivot 40 extends in the second axial direction Z-Z'.

The pivot 40 is adapted to connect the support leg 42 to the lower extremity 54 of the first flange 36 and to the lower extremity 54 of the second flange 38.

The support leg 42 is mounted to pivot about the pivot 40.

The support leg 42 includes a bearing surface 84.

The bearing surface 84 is fixed to the first face 24 of the wall 14.

The arc extinction chambers 18 are adapted to extinguish the electrical arc that is formed during the phase of opening the switchgear 10 when the mobile electrical contacts 64 move away from the fixed electrical contacts 28.

There are as many arc extinction chambers 18 as there are mobile poles 16.

The arc extinction chambers 18 are disposed along the second axial direction Z-Z'.

The arc extinction chambers are fixed inside the switchgear 10 and placed above the fixed electrical contacts 28 and the mobile electrical contacts 64.

The pole shaft 20 is adapted to transmit a command to open or close the switchgear 10 to the mobile poles 16.

The pole shaft 20 includes a conduit 100, cranks 102, a retaining latch 104, an opening spring 106 and connecting links 108.

The conduit 100 extends transversely in the second axial direction Z-Z' and is adapted to pivot about the second axial direction Z-Z'.

The conduit 100 is common to all the mobile poles 16.

There are as many cranks 102 are there are mobile poles 16.

Each crank 102 is adapted to cooperate with a mobile pole 16.

A single crank 102 is adapted to cooperate with the drive mechanism 22.

As shown in FIG. 2, in the case of switchgear including a central mobile pole and two lateral mobile poles, the crank 102 adapted to cooperate with the drive mechanism 22 is the crank 102 that is adapted to cooperate with the central mobile pole.

The cranks 102 are connected to the conduit 100.

The cranks are adapted to be moved between a closed position and an open position.

The closed position corresponds to the closed position of the switchgear 10.

The open position corresponds to the open position of the switchgear 10.

The retaining latch 104 is fixed and is adapted to retain the opening spring 106.

The opening spring 106 is adapted to spring-load the crank 102 toward its open position.

The opening spring 106 has two ends.

The first end of the opening spring 106 is connected to one end of the crank 102.

The second end of the opening spring 106 is connected to the retaining latch 104.

The connecting links 108 are disposed in the second axial direction Z-Z'.

There are as many connecting links 108 as there are cranks 102. Each connecting link 108 is adapted to co-operate with a crank 102.

Each connecting link 108 has two ends.

Each connecting link 108 is mounted so as to pivot at its first end with the rear face 48 of the pole cage 30 of a mobile pole 16.

Each connecting link 108 is mounted to pivot at its second end with the crank 102 of a mobile pole 16.

The drive mechanism 22 is adapted to transmit an instruction to open or close the switchgear 10 to the pole shaft 20.

The drive mechanism 22 includes a trigger member 110, a drive member 112, an opening latch 114, a closing member 116 and an arming member 118.

The trigger member 110 is adapted to trigger opening or closing of the switchgear 10 via the pole shaft 20.

The trigger member 110 includes a fixed shaft 120, a trigger hook 122, a first link 124 and a second link 126.

The fixed shaft 120 of the trigger member 110 extends in the second axial direction Z-Z'.

The trigger hook 122 is articulated to rotate about the fixed shaft 120 of the trigger member 110.

The first link 124 is articulated to rotate about the trigger hook 122.

The second link 126 is mounted to pivot about the first link 124.

The second link 126 is adapted to be mechanically coupled to a cranks 102 of the pole shaft 20.

The drive member 112 is adapted to drive the trigger member 110 via the first link 124.

The opening latch 114 is adapted to hold the switchgear 10 in the open position.

The closing member 116 is adapted to hold the switchgear 10 in the closed position.

The arming member 118 is adapted to move the drive member 112. The movement of the drive member 112 is adapted to place the switchgear 10 in the closed position.

The operation of the switchgear 10 is described next.

The general operation of switchgear and in particular the operation of the drive mechanism 22 are assumed to be known. They are therefore not described hereinafter.

The phases of opening and closing a mobile pole 16 induce loads at the level of the pole cage 30.

The loads are oriented in the plane defined by the first axial direction X-X' and the third axial direction Y-Y'.

The centering parts of the fixing member of each flange enable take-up of these loads.

Numerous other embodiments are possible.

In another embodiment, the fixing part 72 and the centering part 76 are in one piece.

The first fixing member 68 is a shouldered screw, for example.

The fixing part 72 of the shouldered screw has a threaded shape.

The centring part 76 has a circular cylindrical shape and a smooth exterior.

In accordance with another embodiment, the centering part 76 is part of the first flange 36.

The first insertion hole 80 of the first flange then delimits a centering ring having a circular cylindrical shape similar to the centring ring of the first embodiment.

In other variants, each lateral wall includes a stud in addition to the flange fixing members described above. The flanges are then adapted to nest with such studs.

In other variants, one or more of the flange fixing members are ordinary screws, the other fixing members being as described above.

The known switchgear in the prior art documents no longer works after a certain mechanical service life.

The applicant has noted that the cause of such dysfunction is the result of one or more mobile poles breaking.

To be more precise, after a very mechanical service life, the pole cage breaks and no longer makes it possible to obtain a good contact pressure of the mobile electrical contacts on the fixed electrical contacts.

Investigating the causes of the mobile pole breaking has made it possible to identify the means adapted to connect the flanges to the pole cage.

In the prior art, the centering of the flanges on the pole cage was provided by a stud situated at the lower extremity of the pole cage.

In accordance with the structure of the mobile poles 16 in accordance with the invention, loads are taken up by the members 68, 70 for fixing the flanges 36, 38 to the pole cage 30.

Tests carried out on the structure of the mobile poles 16 in accordance with the invention show a longer of mechanical service life than in the prior art. The number of cycles that can be carried out without the mobile pole 16 breaking is much higher than the number of cycles that prior art mobile poles can effect without breaking.

Moreover, the proposed mobile pole 16 has the advantage of not involving significant modification of the structure of the pole cage 30 and the flanges 36, 38. For example, no material is added at the level of the pole cage 30 to guarantee a load take-up better suited to the round trip dynamic effects.

All the embodiments and all the variants described above can be combined, where this is technically possible, to obtain new embodiments of the invention.

The invention claimed is:

1. A mobile pole of a switchgear, comprising:
a pole cage comprising two parallel lateral walls, at least one of the two parallel lateral walls delimiting at least one centering hole defining a centering axis and an interior volume;
a support leg, the pole cage being constrained to rotate with the support leg; and
two flanges, each being configured to be connected to a respective lateral wall of the pole cage, said each flange including fixing members, each said fixing member being configured to cooperate with the at least one centering hole, at least one of the fixing members being a load take-up device including a fixing part defining an insertion axis and a centering part adapted to cooperate with the fixing part, the centering part being configured to be inserted through an entire thickness of the flange and at least partly into the interior volume of the at least one centering hole with which said at least one of the fixing members is configured to cooperate so that the insertion axis of the centering part is aligned with the centering axis of the centering hole with which said at least one of the fixing members is configured to cooperate,
wherein the two flanges are configured to be mounted on a support leg by a pivot point, and a rotation of the flanges about the pivot point is translated to the lateral walls of the pole cage via the centering part of at least one of the fixing members which is the load take-up device.

2. The mobile pole according to claim 1, wherein at least one of the two parallel lateral walls delimits two centering holes each defining the centering axis and the interior volume, the flanges configured to be connected to the two parallel lateral walls including two load take-up devices.

3. The mobile pole according to claim 2, wherein the two parallel lateral walls have an elongate shape in a first direction, the two load take-up devices being arranged along a line parallel to the first direction.

4. The mobile pole according to claim 2, wherein the two parallel lateral walls include an upper extremity, a lower extremity, and a median part connecting said extremities, the support leg being connected to the lower extremity, a first centering hole of the two centering holes being delimited by the upper extremity, a second centering hole of the two centering holes being delimited by the median part.

5. The mobile pole according to claim 1, wherein the two parallel lateral walls have no centering stud.

6. The mobile pole according to claim 1, wherein the fixing part and the centering part of the load take-up device are in one piece.

7. The mobile pole according to claim 6, wherein the load take-up device is a shouldered screw.

8. The mobile pole according to claim 1, wherein the fixing part and the centering part of the load take-up device are two separate parts.

9. The mobile pole according to claim 8, wherein the centering part of the load take-up device is part of at least one of the flanges.

10. A switchgear, comprising:
at least one mobile pole according to claim 1;
a fixed pole for each of said at least one mobile pole being configured to cooperate with a respective fixed pole; and
a mechanism configured to manoeuvre a position of said each of said at least one mobile pole relative to the fixed pole with which the at least one mobile pole is configured to cooperate.

\* \* \* \* \*